United States Patent [19]

Brown et al.

[11] Patent Number: 5,606,651
[45] Date of Patent: Feb. 25, 1997

[54] PROCESS FOR MERGING CAD VECTOR FILES AND AUTOMATICALLY REMOVING DUPLICATE AND OBSOLETE PATTERNS

[75] Inventors: Jerry R. Brown, Gardiner; Paul J. Rich, Hyde Park, both of N.Y.

[73] Assignee: International Business Machines Corporation, Armonk, N.Y.

[21] Appl. No.: 630,723

[22] Filed: Apr. 2, 1996

Related U.S. Application Data

[63] Continuation of Ser. No. 269,858, Jun. 30, 1994.

[51] Int. Cl.$^6$ .................................................. G06T 11/00
[52] U.S. Cl. ........................................ 395/133; 395/135
[58] Field of Search ................................. 395/133, 135, 395/141, 155–161, 600, 650, 919; 364/474.22, 474.23, 474.24

[56] References Cited

U.S. PATENT DOCUMENTS

| | | | |
|---|---|---|---|
| 4,064,489 | 12/1977 | Babb | 364/200 |
| 4,121,196 | 10/1978 | Johnson et al. | 340/146.3 |
| 4,464,719 | 8/1984 | Spellmann | 364/300 |
| 4,571,072 | 2/1986 | Bourbeau, Jr. et al. | 355/79 |
| 4,646,250 | 2/1987 | Childress | 364/518 |
| 4,809,170 | 2/1989 | Leblang et al. | 364/200 |
| 4,827,330 | 5/1989 | Walsh et al. | 358/280 |
| 4,845,653 | 7/1989 | Conrad et al. | 364/521 |
| 4,882,692 | 11/1989 | Saxton et al. | 364/518 |
| 4,912,657 | 3/1990 | Saxton et al. | 364/518 |
| 4,970,666 | 11/1990 | Welsh et al. | 364/522 |
| 5,278,946 | 1/1994 | Shimada et al. | 395/600 X |
| 5,353,393 | 10/1994 | Bennett et al. | 395/135 |
| 5,444,843 | 8/1995 | Nilsson et al. | 395/161 |
| 5,493,679 | 2/1996 | Virgil et al. | 395/600 |

*Primary Examiner*—Almis R. Jankus
*Attorney, Agent, or Firm*—Raymond A. Nuzzo; DeLio & Peterson LLC; Aziz M. Ahsan

[57] ABSTRACT

A process of merging an original drawing file and at least one updated or modified drawing file based on the original drawing file to produce a common or merged drawing file. The original drawing file and the updated drawing file are first stored in a storage medium and then merged. The entities of the original and updated drawings are then compared for duplicate entities and modified entities. Entities of the original drawing that are duplicated in the updated drawing are automatically removed. Entities of the original drawing that have been modified in the updated drawing are also automatically removed.

18 Claims, 14 Drawing Sheets

PROCESS FOR MERGING CAD VECTOR FILES AND AUTOMATICALLY REMOVING DUPLICATE AND OBSOLETE PATTERNS

This application is a continuation of U.S. Ser. No. 08/269,858 filed Jun. 30, 1994.

BACKGROUND OF THE INVENTION

1. Field of the Invention

This invention relates to a process for merging CAD (computer-aided design) vector files.

2. Problem to be Solved

In a typical CAD (computer-aided design) environment, data is added to drawings by multiple users or recipients. Each user first obtains a copy of the source drawing and then makes his or her own changes. Unfortunately, these different versions of the updated drawings cannot replace the original drawing because changes made by other recipients would then be overwritten and lost. In order to properly maintain these modified drawings, all versions of the drawings must be merged together to form a single updated source drawing.

Drawings on CAD systems are composed of graphical entities. Typically, multiple entities are combined into groupings called "shapes". Shapes are then combined into groupings called "patterns". Patterns are then combined into groupings called "views". As used herein, the terms "entities" and "groups of entities" shall be referred to herein as shapes, patterns and views. During the life of a drawing, updates are often made by adding, deleting or modifying shapes. Updates can also be made by changing the groupings of the shapes that make up the patterns and views. Each different modified version of the original drawing is typically referred to as a "different level" of the particular drawing.

Typically, the process of combining different levels of a single drawing into a new, updated drawing is performed by several methods. One conventional method is to manually transfer any changes or modifications from the updated drawings back to the original drawing. However, this method is very time consuming and difficult for complex drawings. Furthermore, this method is conducive to creating errors while manually transferring the modifications. In another conventional method, multiple versions of a particular drawing are first combined into a single composite drawing. Thus, the composite drawing has duplicates of any shapes that existed in both the original and updated drawings. The single composite drawing will also contain obsolete shapes from the original drawing that are modified or non-existent in the updated drawing. In order to complete the merge process, the user then manually deletes those duplicate and obsolete shapes using a standard CAD delete function. However, this manual method is also time consuming and difficult for complex drawings. Furthermore, this method is also susceptible to the creation of errors during the transfer process.

Bearing in mind the problems and deficiencies of conventional merging methods, it is an object of the present invention to provide a method for merging CAD vector files which is automatic.

It is another object of the present invention to provide a new and improved merging process that significantly reduces the amount of time necessary to merge a plurality of CAD vector files.

It is yet another object of the present invention to provide a new and improved process for merging CAD vector files that significantly reduces the probability of error creation.

SUMMARY OF THE INVENTION

The above and other objects and advantages, which will be apparent to those skilled in the art, are achieved in the present invention which is directed to, in a first aspect, a process for merging CAD files, comprising the steps of: a) providing an original drawing file having at least one original drawing entity; (b) assigning a first attribute to the original drawing entity; (c) providing a modified drawing file based on the original drawing file and having at least one modified drawing entity; (d) assigning a second attribute to the modified drawing entity; (e) merging the original drawing file with the modified drawing file to form a common drawing file that includes the original drawing entity and the modified drawing entity; (f) comparing the entity having the first attribute with the entity having the second attribute; (g) automatically deleting from the common drawing file the entity having the second attribute if it is a duplicate of the entity having the first attribute; and (h) thereafter, storing the resulting common drawing file.

In a related aspect, the present invention is directed to a process for merging CAD files, comprising the steps of: (a) providing an original drawing file having at least one original drawing entity; (b) assigning a first attribute to the original drawing entity; (c) providing a modified drawing file based on the original drawing file and having a at least one modified drawing entity; (d) assigning a second attribute to the modified drawing entity; (e) merging the original drawing file with the modified drawing file to form a common drawing file that includes the original drawing entity and the modified drawing entity; (f) comparing the entity having the first attribute with the entity having the second attribute; (g) automatically deleting from the common drawing file the entity having the first attribute if it is not a duplicate of the entity having the second attribute; and (h) thereafter, storing the resulting common drawing file.

In a further aspect, the present invention is directed to a process for merging CAD files, comprising the steps of: (a) providing an original drawing file having a least one original drawing entity, (b) assigning a first attribute to the original drawing entity, (c) providing at least one modified drawing file based on the original drawing file and having at least one modified drawing entity, (d) assigning a second attribute to the modified drawing entity, (e) merging the original drawing file with the modified drawing file to form a common drawing file that includes the original drawing entity and the modified drawing entity, (f) searching the common drawing file for and retrieving a lowest level entity having the first attribute, (g) searching the common drawing file for and retrieving a lowest level entity having the second attribute, (h) determining whether the type of the lowest level entity having the first attribute matches the type of the lowest level entity having the second attribute, (i) determining whether the point coordinates of the lowest level entity having the first attribute match the point coordinates of the lowest level entity having the second attribute, (j) determining whether the point-type of the lowest level entity having the first attribute shape matches the point-type of the lowest level entity having the second attribute, (k) automatically deleting the lowest level entity having the first attribute if it is a duplicate of the lowest level entity having the second attribute, (l) automatically deleting the lowest level entity having the first attribute if it is obsolete, and (m) thereafter, storing the resulting common drawing file.

BRIEF DESCRIPTION OF THE DRAWINGS

For a fuller, understanding of the invention, reference should be made to the following description taken in connection with the accompanying drawings, in which.

DESCRIPTION OF THE PREFERRED EMBODIMENTS

In one aspect, the present invention is directed to a process for automatically removing duplicate geometric shapes as a plurality of drawings are merged into a single updated drawing and is illustrated by the flow diagrams shown in FIGS. 6A–6E. In another aspect, the present invention is directed to a process for removing obsolete or unique shapes as a plurality of drawings are merged into a single updated drawing and is illustrated by the flow diagrams shown in FIGS. 7A–7B. In each flow diagram, each step is to be interpreted as being performed by programming wherein each block represents one or more of a sequence of processor instructions.

Figure 8:
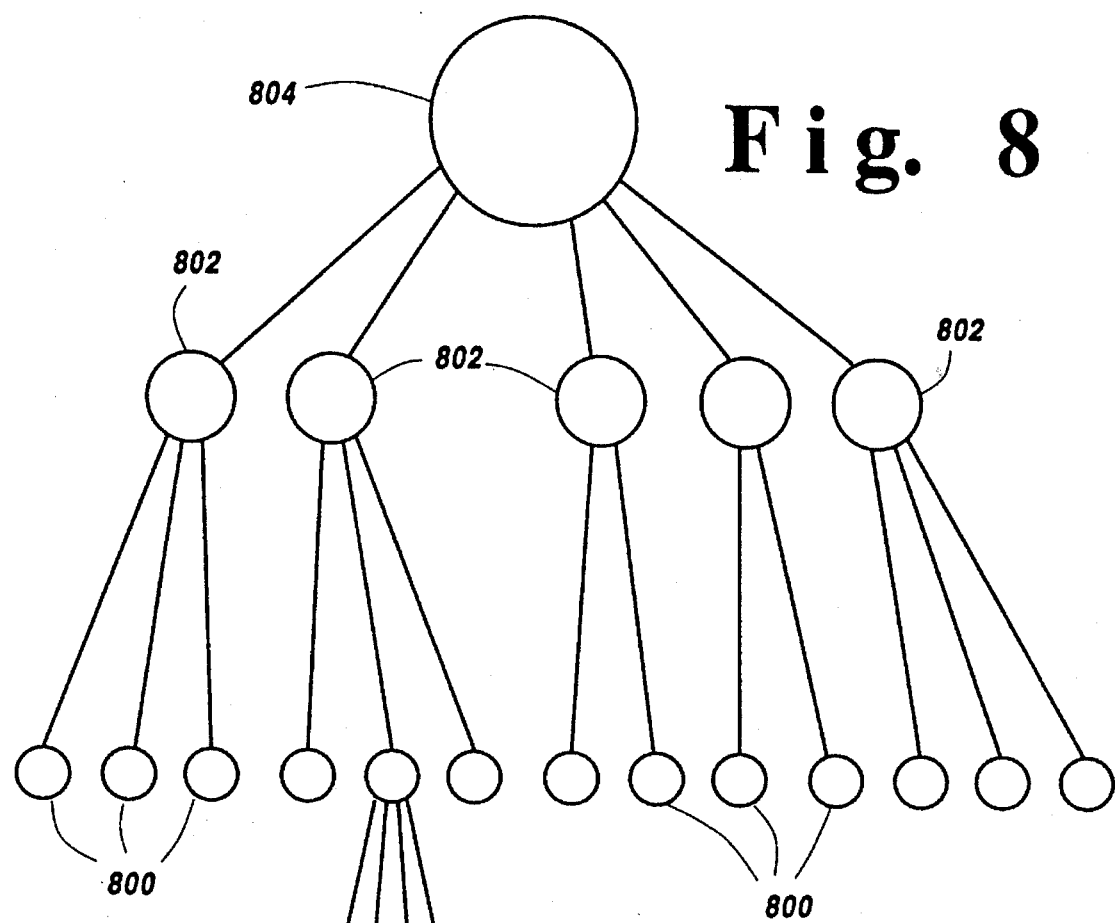
FIG. 8 is a hierarchical diagram illustrating the composition of drawings typically stored in CAD systems.

Referring to hierarchical tree or diagram of FIG. 8, CAD systems are typically programmed to group multiple geometric entities into larger groupings called "shapes" 800. Shapes are comprised of "points" 801 which will be discussed in greater detail below. Multiple shapes are grouped into larger units called "patterns" 802. The "shapes" are then referred to as the "children of the patterns". Multiple patterns are grouped into larger units called "views" 804. Thus, multiple patterns are referred to as the "children of the views". Therefore, "shapes" are also referred to as the "grandchildren of the view".

Although other CAD systems may use terminology other than "shapes", "patterns" and "views" to identify geometric entities, the processes of the present invention can be easily adapted to such systems since the comparison functions of the embodiments shown in FIGS. 6A–6E and 7A–7E, as described below, are performed at the lowest level of entity groupings. Throughout the ensuing description, "shapes" are defined to be the lowest level entity grouping.

In the processes shown in FIGS. 6A–6E and FIGS. 7A–7F, a computer processor initiates a search of a CAD drawing file for multiple copies of patterns and shapes. In describing the processes of the present invention, shapes and patterns of an original drawing are referred to as "source shapes" and "source patterns", respectively. Shapes and patterns of updated drawings are referred to as "target shapes" and "target patterns", respectively.

In accordance with the present invention, in order to determine if a source shape and a target shape match exactly, each process effects a comparison of the: (i) shape type, (i) shape-point coordinates, and (iii) shape-point type. The shape-type is defined to be the geometric shape, e.g. line, arc, text, etc. A shape generally comprises a "single point" and at least one "drawn point". The drawn points define the size of the source shape, e.g. the size of the line, arc, etc.

Figure 9A:
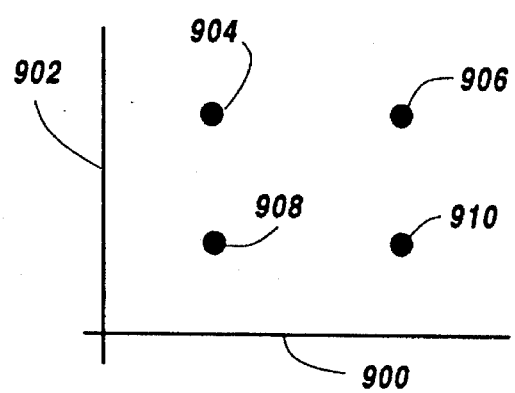
FIGS. 9A and 9B are diagrams illustrating single points and drawn points, respectively.
Figure 9B:
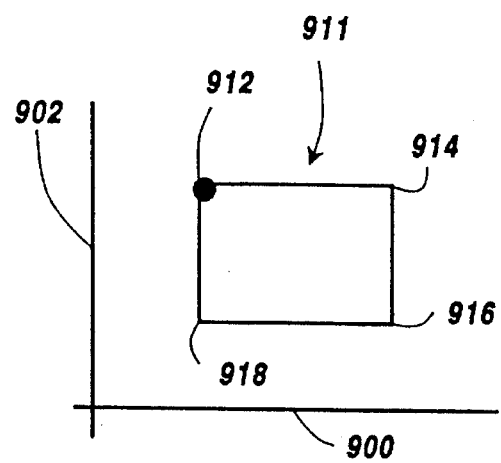

Referring to FIG. 9A, single points 904, 906, 908 and 910 are stored in a computer data base according to their coordinate positions defined by axes 900 and 902 which represent the X-axis and Y-axis, respectively. Referring to FIG. 9B, square or box 911 is defined by single point 912 and drawn points 914, 916 and 918. Points 912, 914, 916 and 918 are stored in a computer data base according to their coordinate positions defined by axes 900 and 902. Although points may be defined by two (2) dimensional (X,Y) coordinate position as shown in FIGS. 9A–9B, points may also be defined by a three (3) dimensional (X,Y,Z) coordinate position. Thus, shape point-type refers to whether the point is a single point or a drawn point.

In accordance with the present invention, the source and target shapes will match exactly if: (i) the target and source shapes are of the same shape-type, (ii) all coordinates of the source shape points match coordinates of a target shape point, (iii) the point type of each,source shape point matches the point-type of a target shape point, and (iv) for text shapes, the character strings must match. As described below, the difference between the process of FIGS. 6A–6E and that of FIGS. 7A–7E is the sequence of steps implemented after it is determined whether a source entity matches a target entity.

In describing the processes of the present invention, it is assumed that the geometric entities of the original drawing have already been converted into these groupings, i.e., shapes, patterns and views. Since there is no guarantee that the original drawing contains all of the aforementioned groupings, the processes shown in FIGS. 6A–6E and 7A–7F begin by searching at the "view" level and then sequentially step down the family or hierarchical tree (see FIG. 8) to the pattern and shape levels. If the highest level of entity groupings is at the shape level, then it is only necessary for the shape of one grouping to match a shape of the other grouping in order for the entity groupings to be considered duplicates. Similarly, all shapes making up a pattern must have matching duplicate shapes if the pattern is to be flagged as having a duplicate. Entity groupings with higher level structures, i.e. views, must have more matching shapes to be considered duplicates. If a drawing comprises only one shape, then it is considered to have one shape, one pattern and one view.

Figure 1:
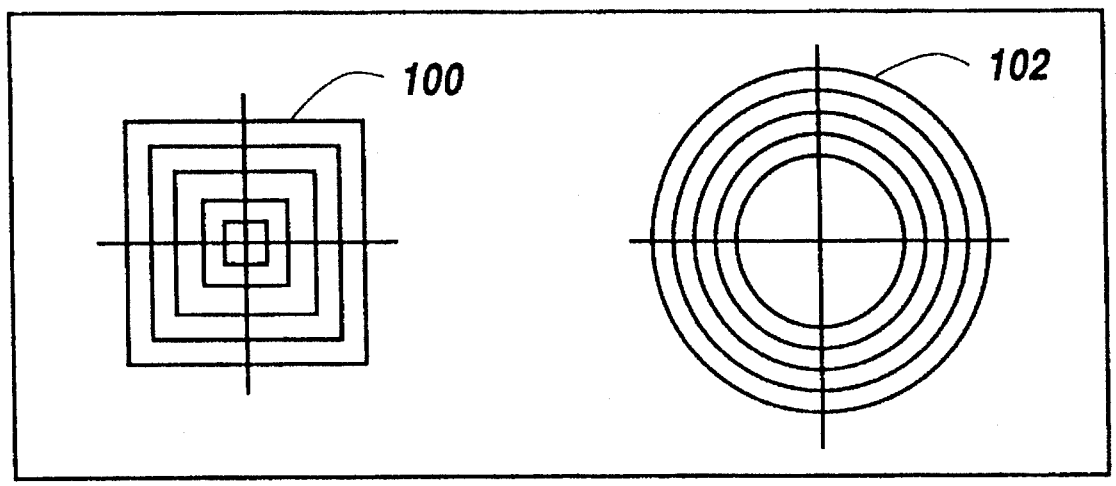
FIGS. 1–5 show the overall process of combining different levels of a single drawing into a new updated drawing.
Figure 2:
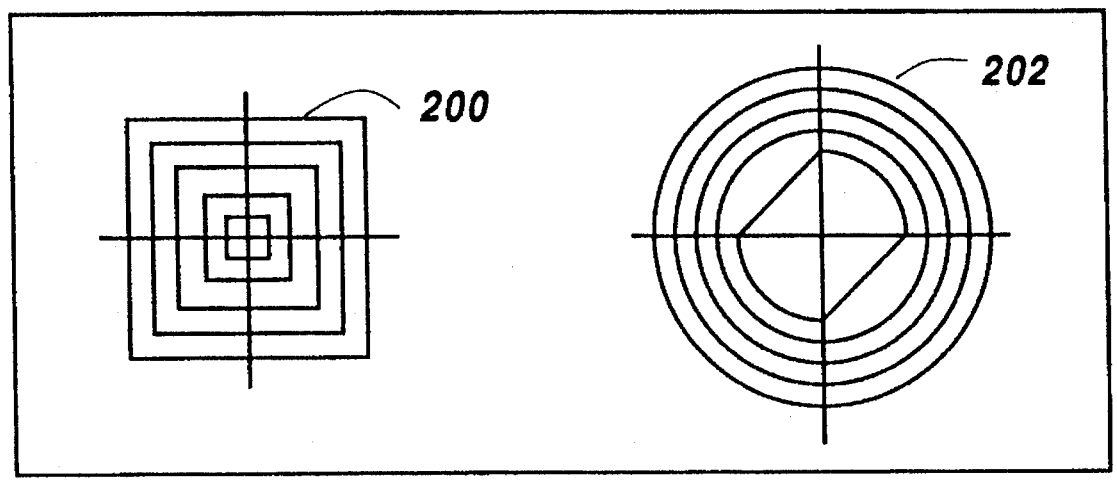
Figure 3:
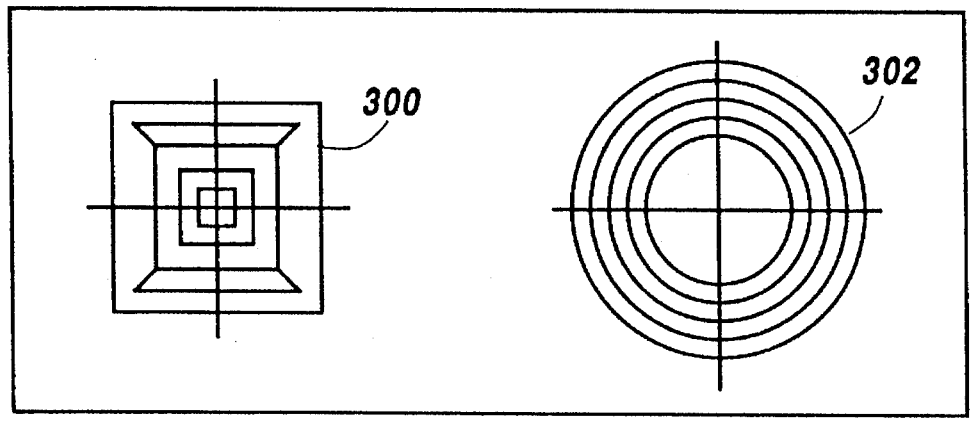
Figure 4:
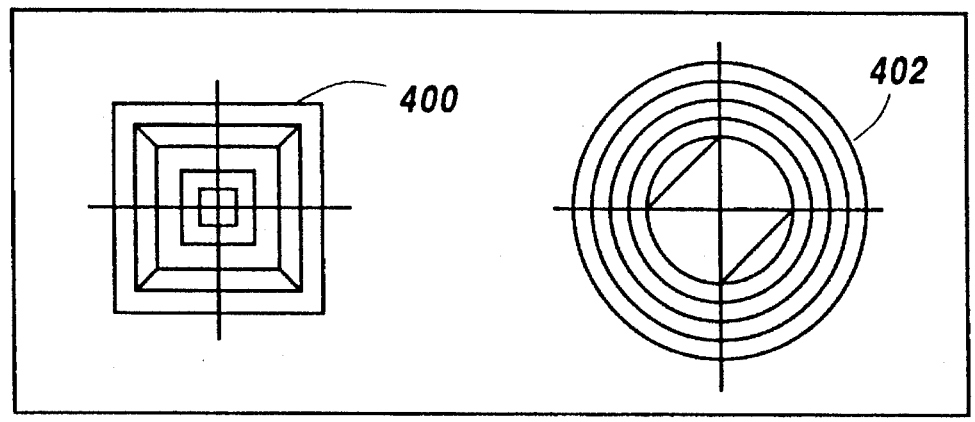
Figure 5:
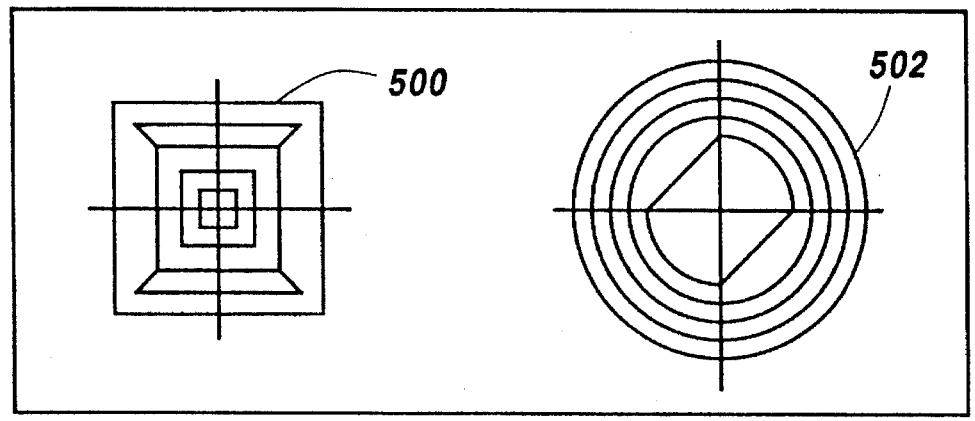

FIGS. 1–5 diagrammatically illustrate the merging processes of the present invention. Referring to FIG. 1, diagrams 100 and 102 comprise original drawings stored in the CAD vector file. FIG. 2 illustrates a modified version or a different level of the original drawing shown in FIG. 1. Diagram 200 is exactly the same as diagram 100. Diagram 202, however, represents a modified version of diagram 102. FIG. 3 represents a further modified version or different level of FIG. 1 wherein diagram 300 is a modified version of diagram 100 and diagram 302 is exactly the same as diagram 102. FIG. 4 is a temporary composite drawing having diagrams 400 and 402 which are produced by merging the original drawing shown in FIG. 1 with the modified versions represented by FIGS. 2 and 3. FIG. 5 is the completed updated drawing produced by automatically deleting duplicate and obsolete shapes from the temporary composite diagrams 400, 402 in accordance with the processes of the present invention. Thus, FIGS. 1–5 represent the scenario wherein a plurality of modified drawings (FIGS. 2 and 3) are merged with an original drawing (FIG. 1) to form a common drawing file (FIG. 4). Alternately, each modified drawing (FIGS. 2 and 3) can be merged separately with the original drawing of FIG. 1. For instance, modified drawing FIG. 2 can be merged with original drawing FIG. 1 to form a common or merged drawing file. The processes of the present invention are then performed on the merged drawing file. The completed and final drawing is then merged with the next modified drawing FIG. 3. The processes of the present invention are then performed on the merged or common drawing file to produce the completed and final drawing shown in FIG. 5.

Prior to performing the processes of the present invention, the original and modified drawings are stored on a hard disk, floppy disk or other suitable storage medium. The original and modified drawings are then loaded into a memory device where the drawings are merged into a common drawing file. After the processes of the present invention are performed on the merged or common drawing file, the complete and final drawing is written or recorded over the original drawing stored on the hard or floppy disk. The complete and final drawing can then be displayed on peripheral monitors and/or printed out on computer printers in order to provide schematic drawings to the users.

Figure 6A:
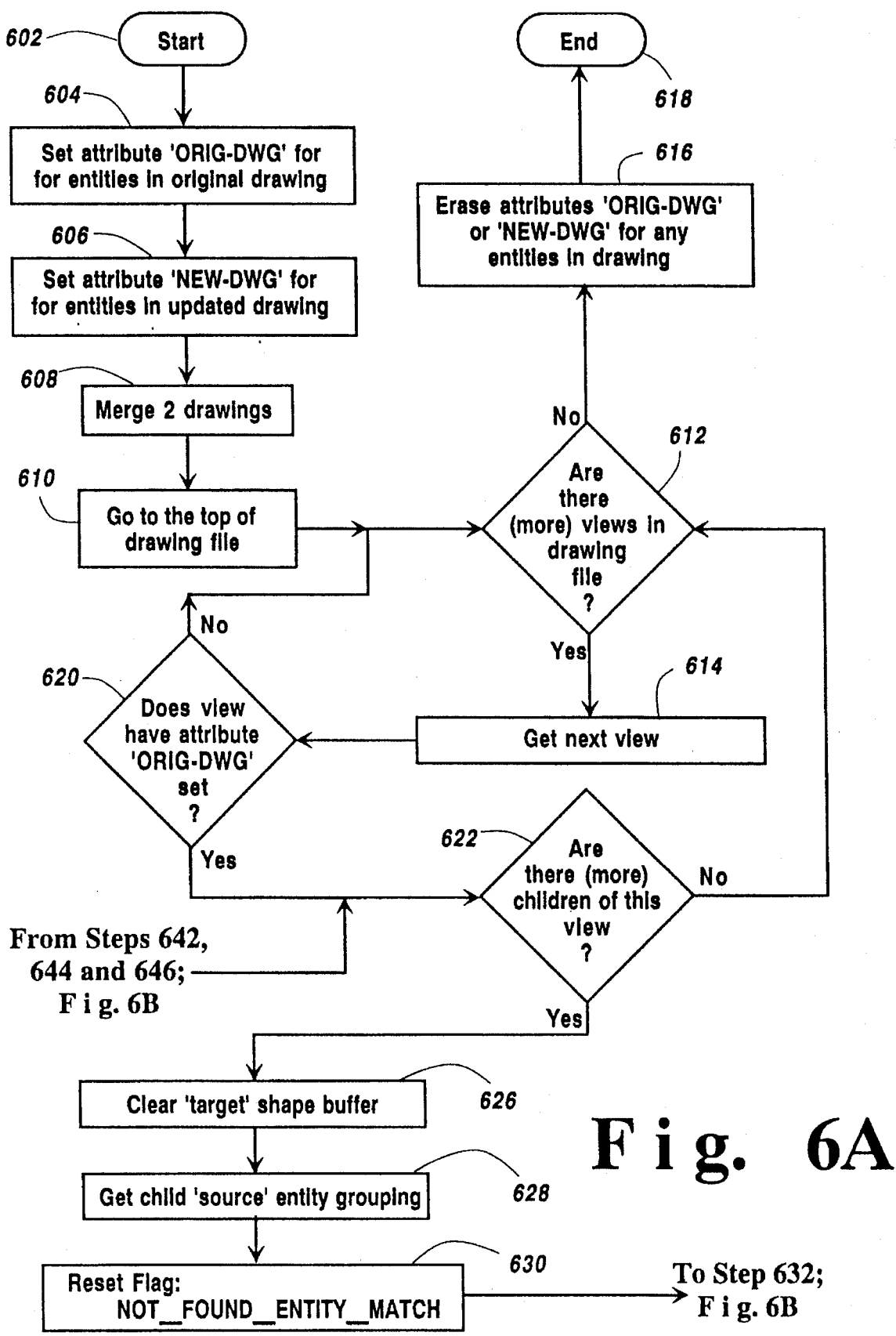
FIGS. 6A–6E are flow diagrams illustrating the steps of one embodiment of the present invention.
Figure 6B:
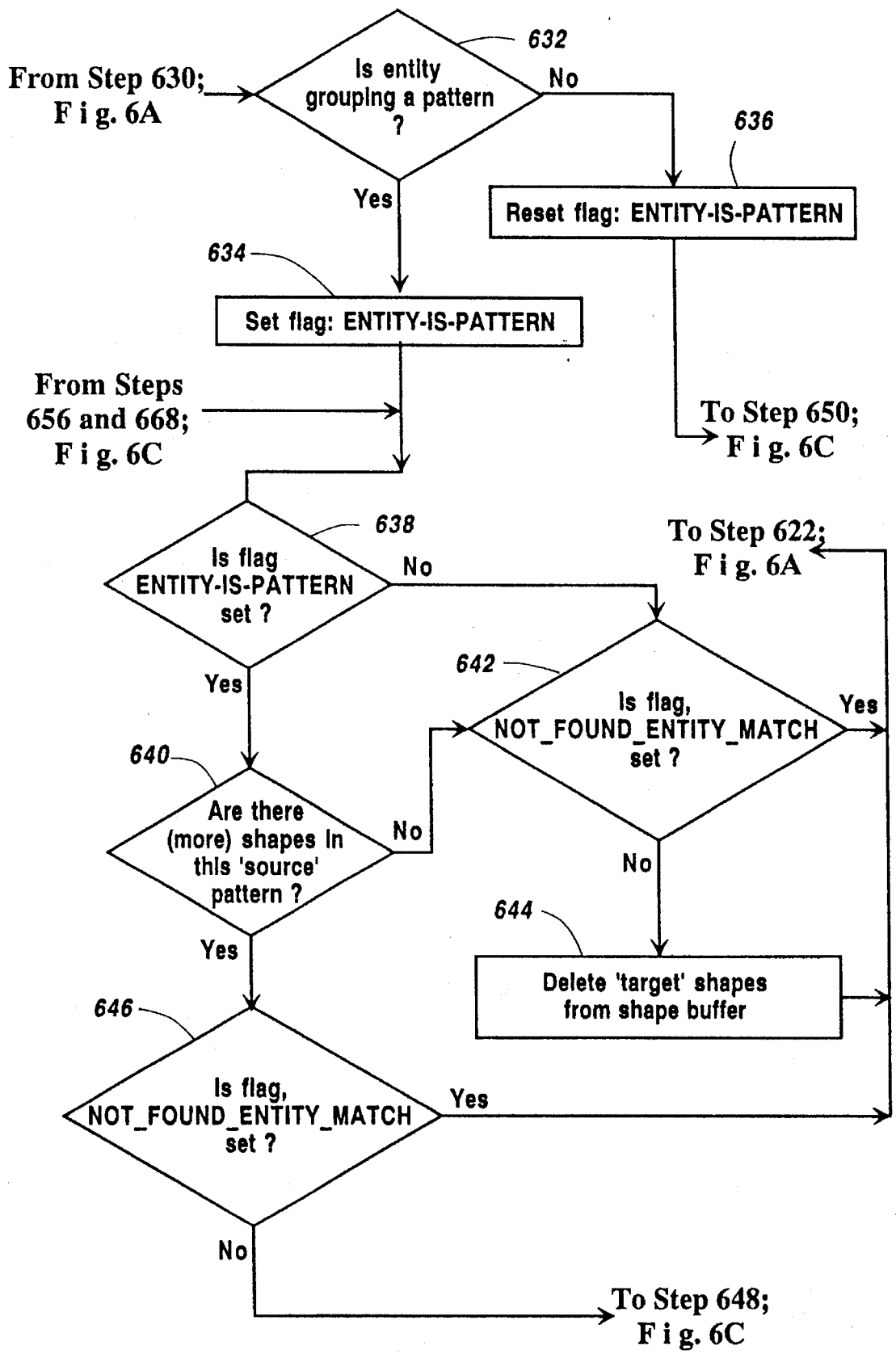
Figure 6C:
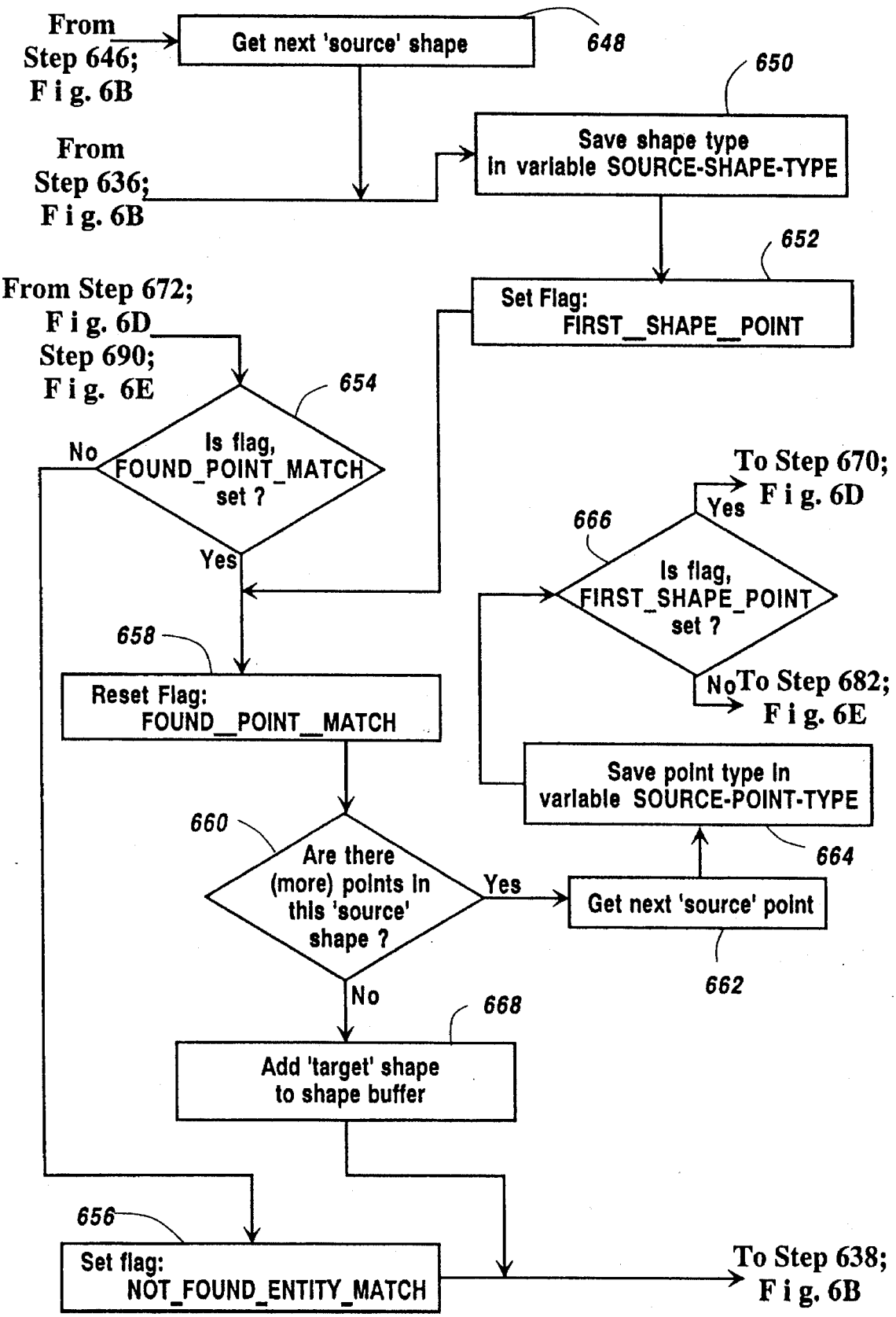
Figure 6D:
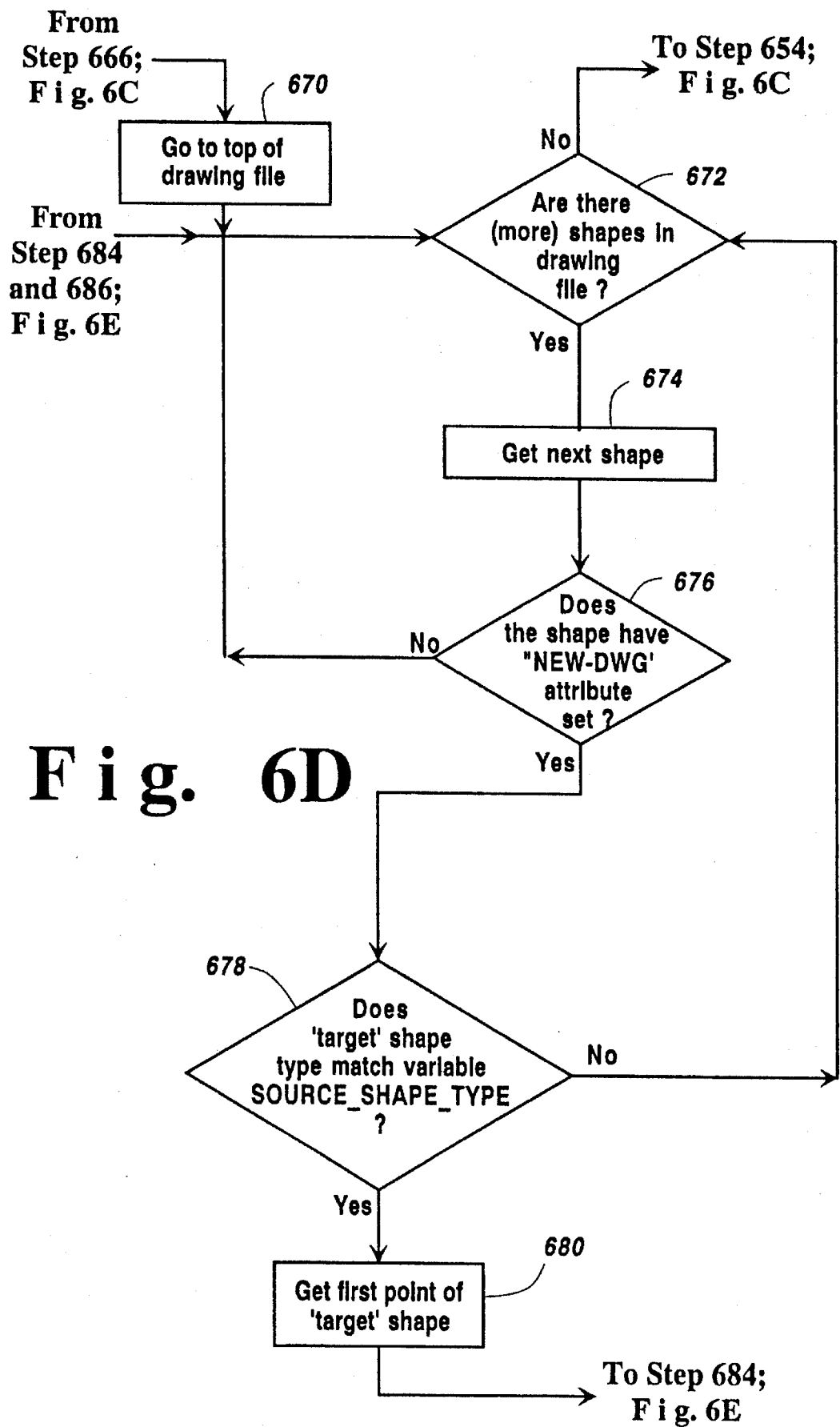
Figure 6E:
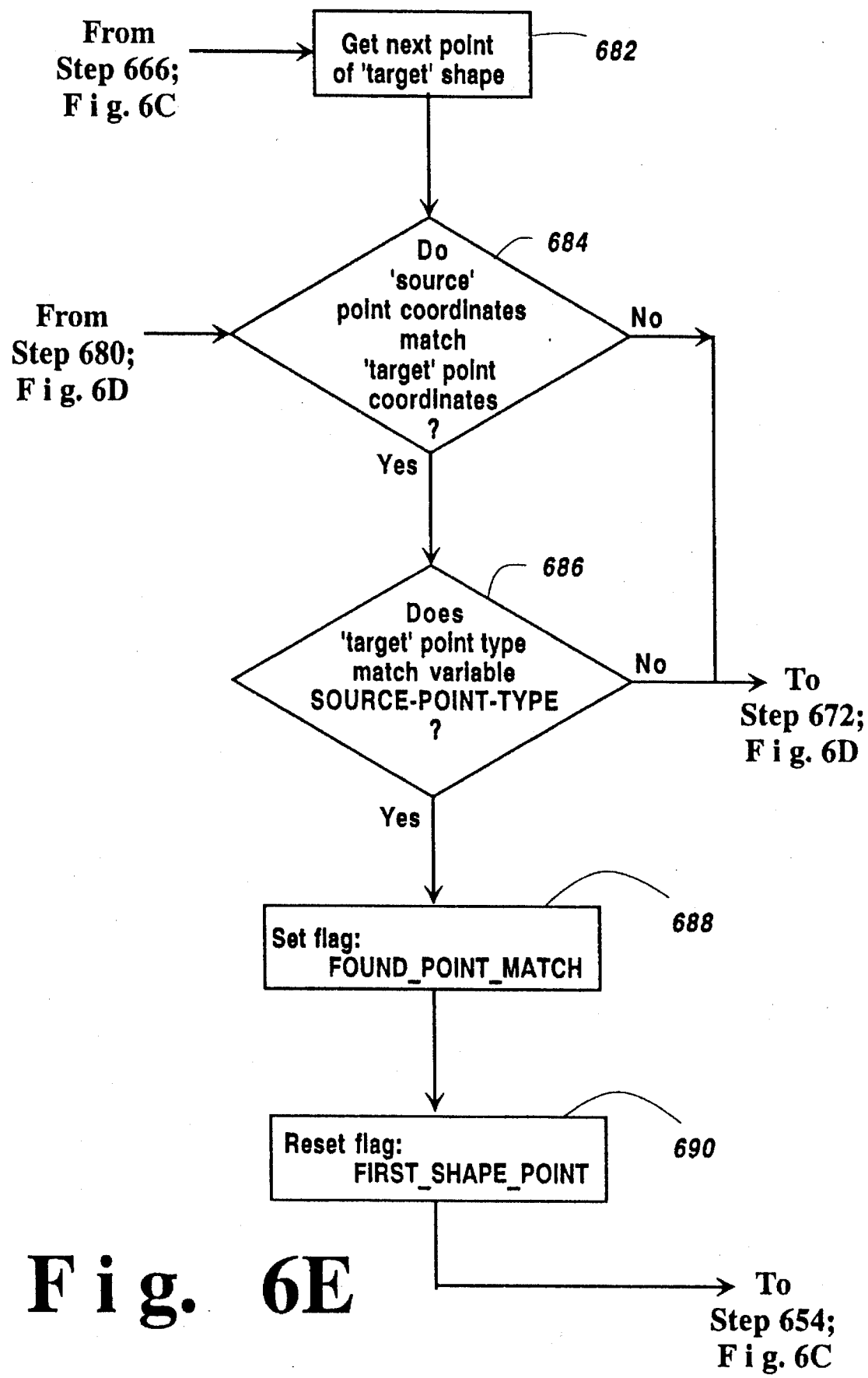

The process shown in FIGS. 6A–6E searches for duplicate shapes in the updated version of the drawing and then deletes these duplicate shapes from the composite drawing. The actual comparison function for determining whether entities are duplicates is implemented on the pattern level of the original drawing. The process will now be described in detail. Referring to FIG. 6A, the process starts at step 602. In steps 604 and 606, attributes are defined by the user for the original and modified versions of the drawings, respectively. This step requires assigning tags or identifiers to the shapes, patterns and views to identify these entities as those of the original drawing or of the new or modified drawing. The original and updated drawings are stored in memory prior to step 608. Steps 608 merges the files containing the original drawing and updated drawing into one common vector file (the merged set or common drawing file). After step 608, steps 610 and 612 effect a search for views (or the next view for successive iterations) in the common file. If no view (or more views) is located in the common file, the attributes for the original drawing and the new or modified drawing are erased in step 616 for any entities of these drawings. The erasure of these attributes effected by step 616 prevents inadvertent use of these attributes for successive merging processes. After the attributes are erased in step 616, the process ends in step 618. If there are views (or more views) in the drawing file, then step 614 effects a retrieval of the next view from the common drawing file. Step 620 determines whether the attribute of the view retrieved in step 614 is an original drawing attribute. If the next view does not have the original drawing attribute, then steps 612 and 614 effect a retrieval of views until step 620 effects a confirmation that the view retrieved has an original drawing attribute.

While an initial search is being implemented on the view level via steps 610, 612, 614 and 620, it is to be understood that the view level is utilized for retrieving patterns and shapes at the highest level. As shown below, this process does not effect a search for duplicates at the view level. Comparison testing is done at the pattern level to determine if shapes in the updated or modified drawing match shapes in the original drawing. This process could easily be modified though, to include searches for duplicates at the view level as well.

If in step 620, it is determined that the view retrieved in step 614 has the original drawing attribute, then step 622 determines whether there are children (or more children for a successive iteration) of the view. If there are no children of the view, then the searching process of step 612 is reinitiated, which has already been described above. Initially, however, each view will always have a first child. If there are children of the view, then step 626 effects a clearance of the target shape buffer memory. Step 628 then effects a retrieval of the child source entity grouping. At this point, it is not known whether the child source entity grouping is a shape or a pattern. Step 630 then resets a flag entitled Not Found Entity Match to indicate no matching entities have yet been found. Step 632 then determines whether the entity grouping is a pattern or shape. If the entity is not a pattern, step 636 then resets a flag entitled Entity, Is A Pattern to indicate the entity is not a pattern. If the entity is not a pattern, then it is a shape. Thus, the process shifts to step 650 (FIG. 6C) which effects storage of the source shape-type in memory. Step 650 and the steps following thereafter are explained below.

If the entity is a pattern, then step 634 sets the flag entitled Entity Is A Pattern to indicate the entity is a pattern. At this point in the algorithm, step 638 determines if the current entity is a pattern or shape. If the current entity is a pattern, the process shifts to step 640, where the next child shape (if any) will be processed. If, on the other hand, the current entity is a shape, then the process has finished analyzing this source entity and step 642 determines if a duplicate shape has been found. If one has been found, step 644 then deletes the duplicate shape. In any case, in step 642, if the Not Found Entity Match flag is set, then no match exists for the current entity. The process then returns to step 622 to effect a search for the next child of the view. If step 642 determines that the Not Found Entity Match flag is not set, to indicate an entity match exists, then step 644 effects a deletion of target shapes in the target shape buffer memory which temporarily stores target shapes. These deleted target shapes are duplicates of shapes in the original drawing. Step 622 then effects a search for more children of the view.

If step 638 determines that the Entity Is A Pattern flag is set, then step 640 determines whether there are shapes or more shapes in the source pattern. If there are more shapes, then step 646 determines if the Not Found Entity Match flag is set. If the Not Found Entity Match flag is set, then a previous child shape did not have a match, and as a result, the pattern does not have a match. Step 622 then effects a search for more children of the view. If step 646 determines that the Not Found Entity Match flag is not set, then step 648 effects a retrieval of the next source shape. Once the next source shape is retrieved, step 650 saves the shape type in memory. Step 652 then sets the flag entitled First Shape Point to indicate a source-shape type is stored in memory and that the first point in the source shape is about to be processed. After this step, step 658 resets a flag entitled Found Point Match to indicate that presently, no match exists between a target shape point and a source shape point. Step 660 then determines if there are points or more points in the source shape. If there are none, then step 668 effects storage of the target shape in the target shape buffer memory. The process then shifts to step 638. Step 638 and the steps following thereafter have been previously explained above. If there are more points in the source shape, then step 662 effects a retrieval of the next source point. Once the next source point is retrieved, step 664 then effects storage of the source point type in memory. Step 666 determines if the First Shape Point flag is set. If the First Shape Point flag is set, then step 670 effects a search for shapes in the common drawing file. If the First Shape Point flag is not set, then step 682 retrieves the next target shape point. Thus, if the First Shape Point flag is not set, it indicates that a target shape already has been retrieved and the first or the next target shape point is needed for comparison with a source shape point.

As previously stated, if step 660 indicates there are no more points in the source-shape, step 668 effects storage of the target shape in the target shape buffer memory. Thus, the target shape is not stored in the buffer memory until all points in the source shape match those in the target shape. The process then shifts to step 638 which then determines whether the Entity Is A Pattern flag is set. The operation of step 638 and the steps following thereafter have been previously explained above.

If step 666 determines that the First Shape Point flag is not set, then we have already started processing a target shape. The process then jumps to steps 682 and 684, where the next source shape point will be compared to the next target shape point. If, on the other hand, step 666 determines that the First Shape Point is set, then steps 670, 672, and 674 effect a search from the top of the drawing file to find a matching shape. If there are no shapes in the drawing file, then step 654 determines if the Found Point Match flag is set. If this flag is not set, then step 656 sets the Not Found Entity Match flag to indicate the entity of the original drawing does not match the entity of modified drawing. Then, step 638 determines whether the Entity Is A Pattern flag is set. Step 638 and the steps following thereafter have previously been explained. If step 654 determines the Found Point Match flag is set, then step 658 resets this flag. Step 660 then determines whether there are more points in the source shape. The operation of step 660 and the steps following thereafter have been previously explained.

If step 672 determines there are more shapes in the drawing file, then step 674 effects the retrieval of the next shape. Step 676 then determines whether the retrieved shape has a new drawing attribute. If step 676 determines the new shape does not have the new drawing attribute, then step 672 effects another search to determine whether more shapes are in the drawing file. Step 674 then effects the retrieval of another shape. If step 676 determines the new shape has the new drawing attribute, then step 678 effects a comparison of the target shape type with the source shape type. If there is no match, then steps 672, 674 and 676 effect a search in the drawing file for more target shapes. If step 678 determines there is a match, then step 680 effects a retrieval of the first point of the target shape. Step 684 then determines whether the source point coordinates match the target point coordinates. If there is no match, then step 672 initiates a search for more shapes in the drawing file. If step 684 determines a match exist, then step 686 determines if the target point-type matches the source point-type. If a match does not exist, then step 672 initiates a search for more shapes in the drawing file. If a match does exist, then step 688 sets the Found Point Match flag, step 690 resets the First Shape Point flag, and the process jumps to step 654. Step 654 determines whether the Found Point Match flag is set. Since this flag was set in step 688, the process goes to step 658 where the Found Point Match flag is reset.

Step 660 then determines if there are more points in the source shape. If there are no points left in the source shape, then all source points have been processed. Thus, the target shape is a duplicate if: (i) step 678 determines the target shape type and source shape type are the same, (ii) step 684 determines all coordinates of the source shape points match coordinates of the target shape points, and (iii) step 686 determines that the source shape point-types match their associated target shape point-types. Step 668 then stores the target shape to the target shape buffer memory. The process then shifts to step 638. Step 638 determines whether the source entity that has been processed is a pattern. If so, then step 640 determines if this is the last shape in the pattern. If it is the last shape, then step 642 checks if the flag Not Found Entity, Match is set. If it is not set, then the pattern has a match and the matching target shapes are deleted from memory in step 644. Step 622 then initiates a new search for more children of the view.

Figure 7A:
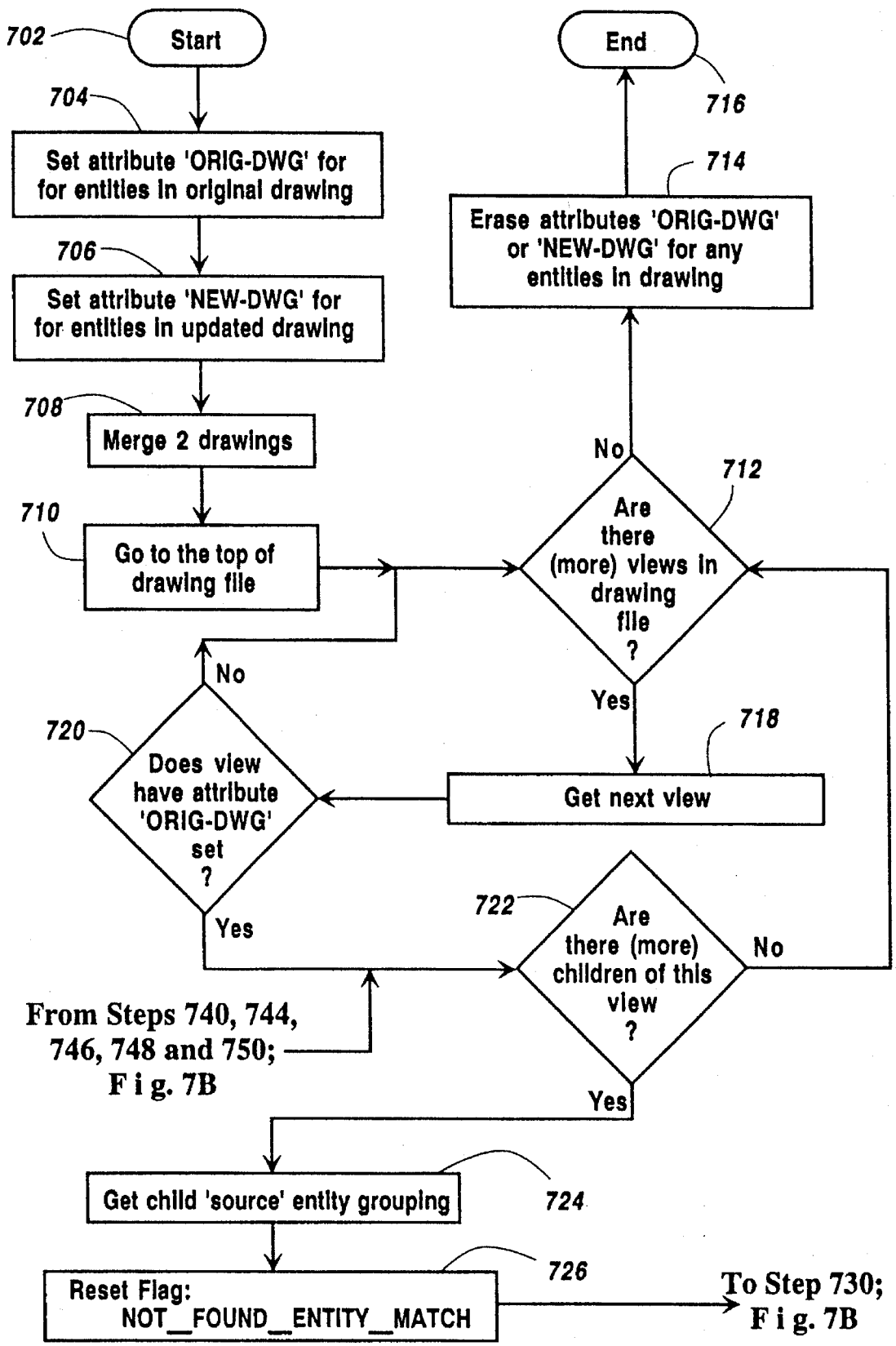
FIG. 7A–7F are flow diagrams illustrating the steps of another embodiment of the present invention.
Figure 7B:
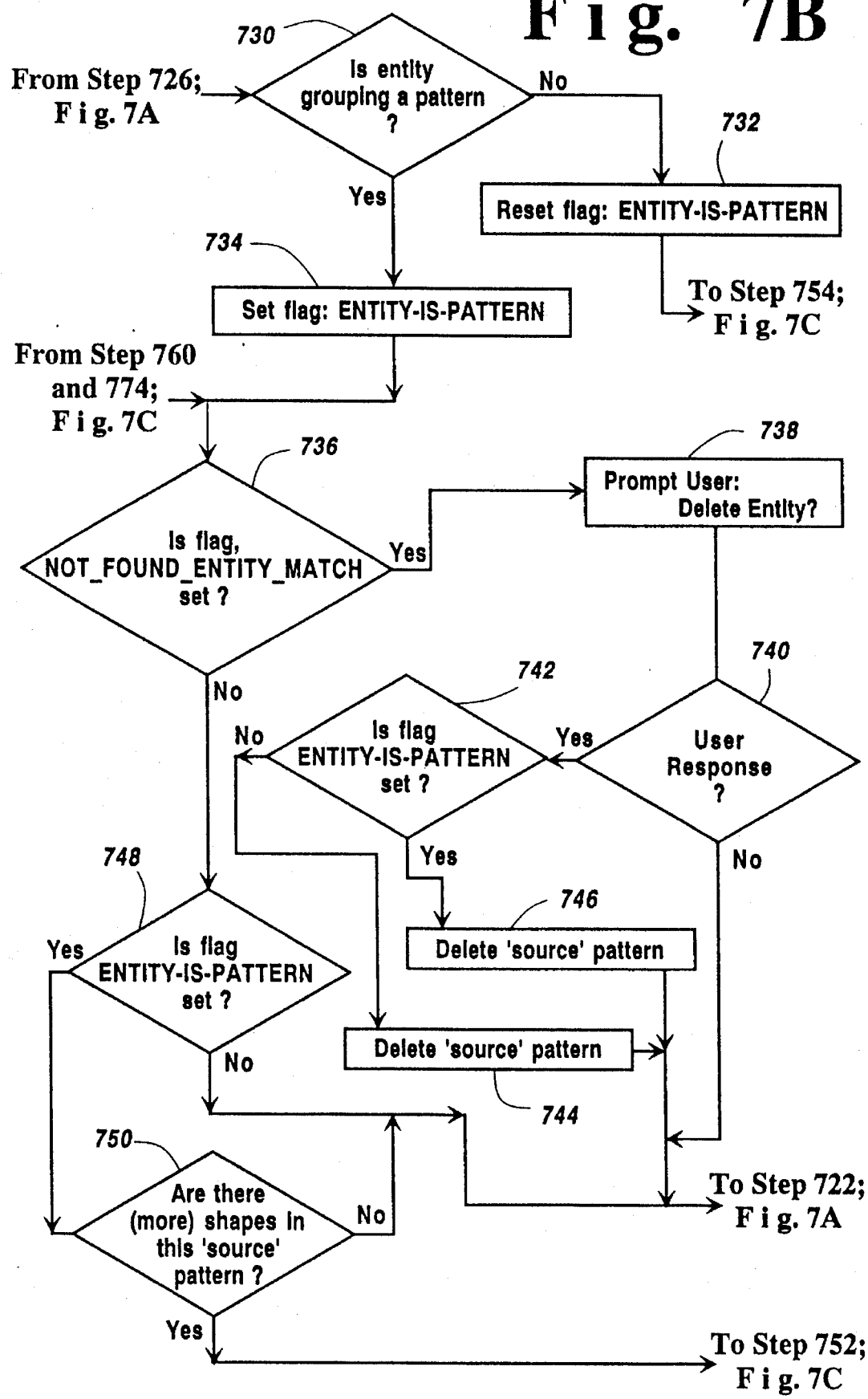
Figure 7C:
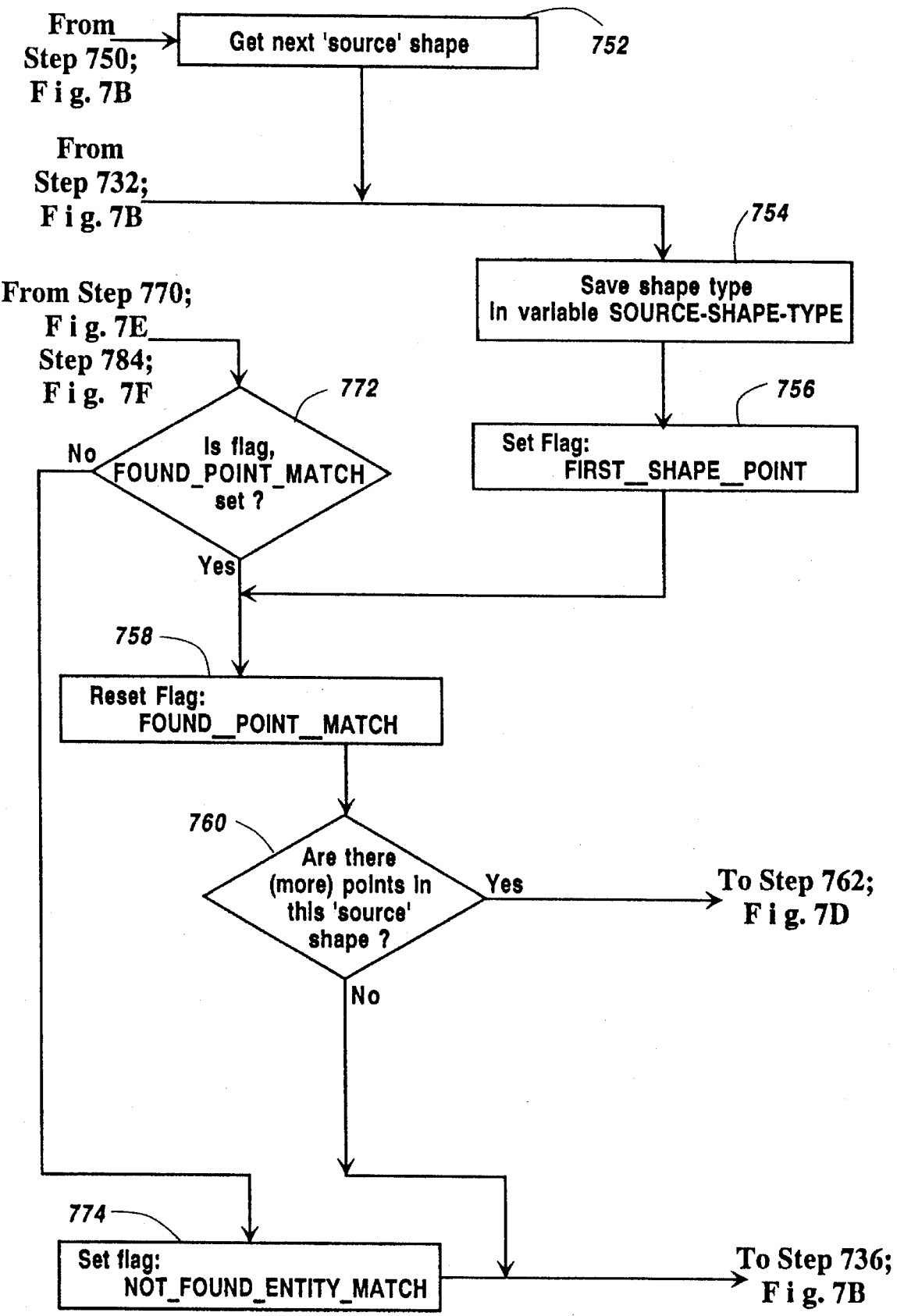
Figure 7D:
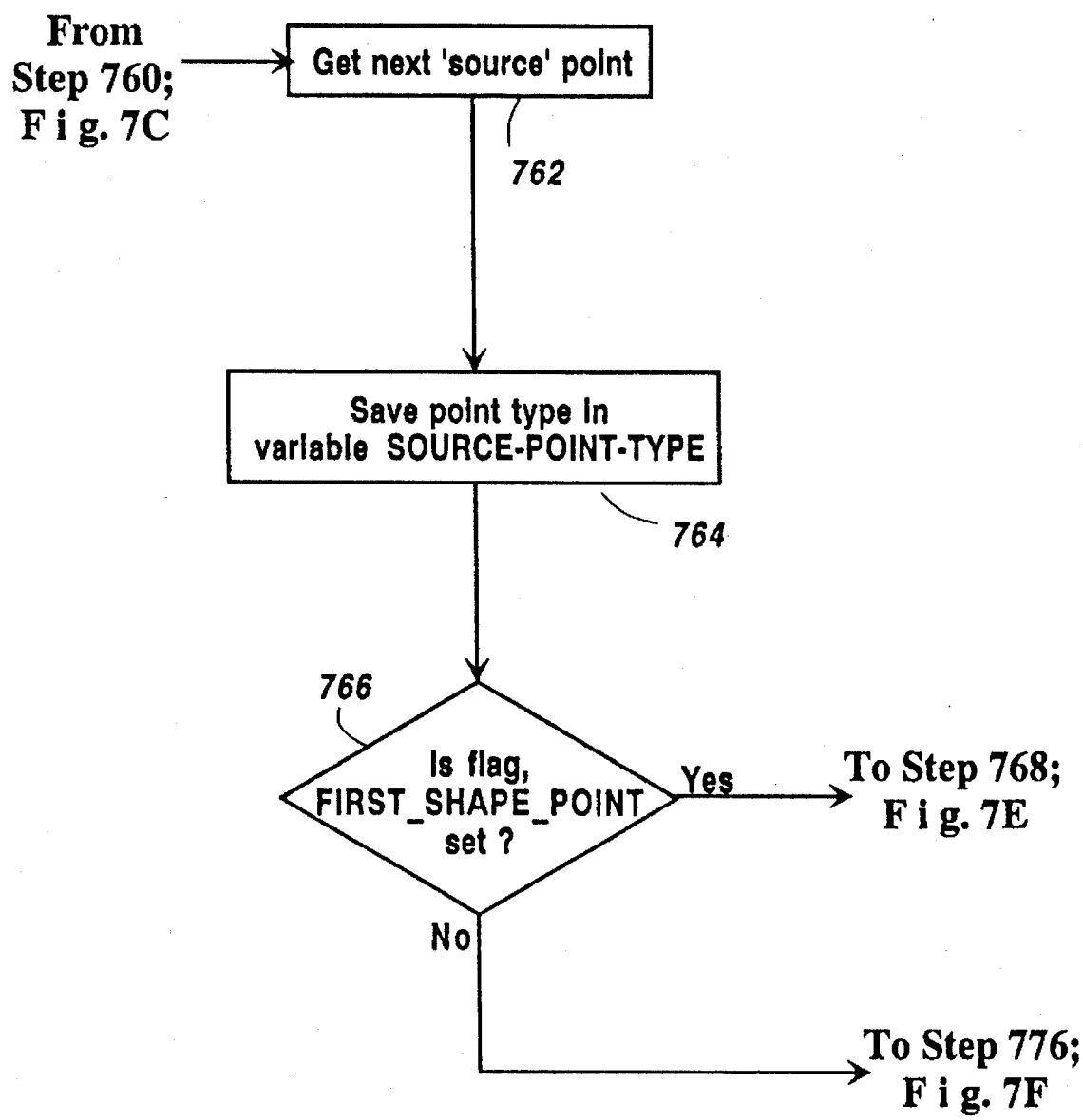
Figure 7E:
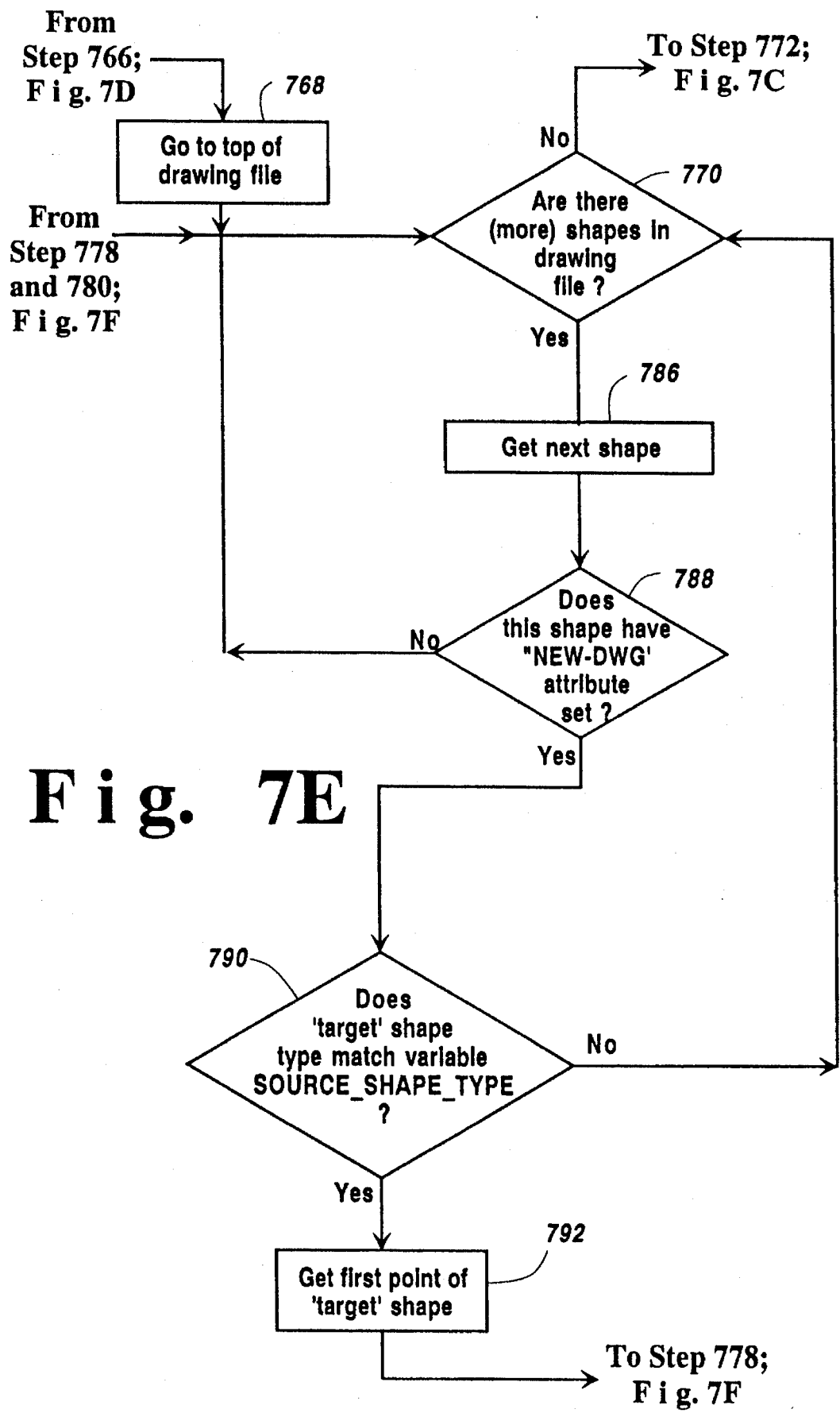
Figure 7F:
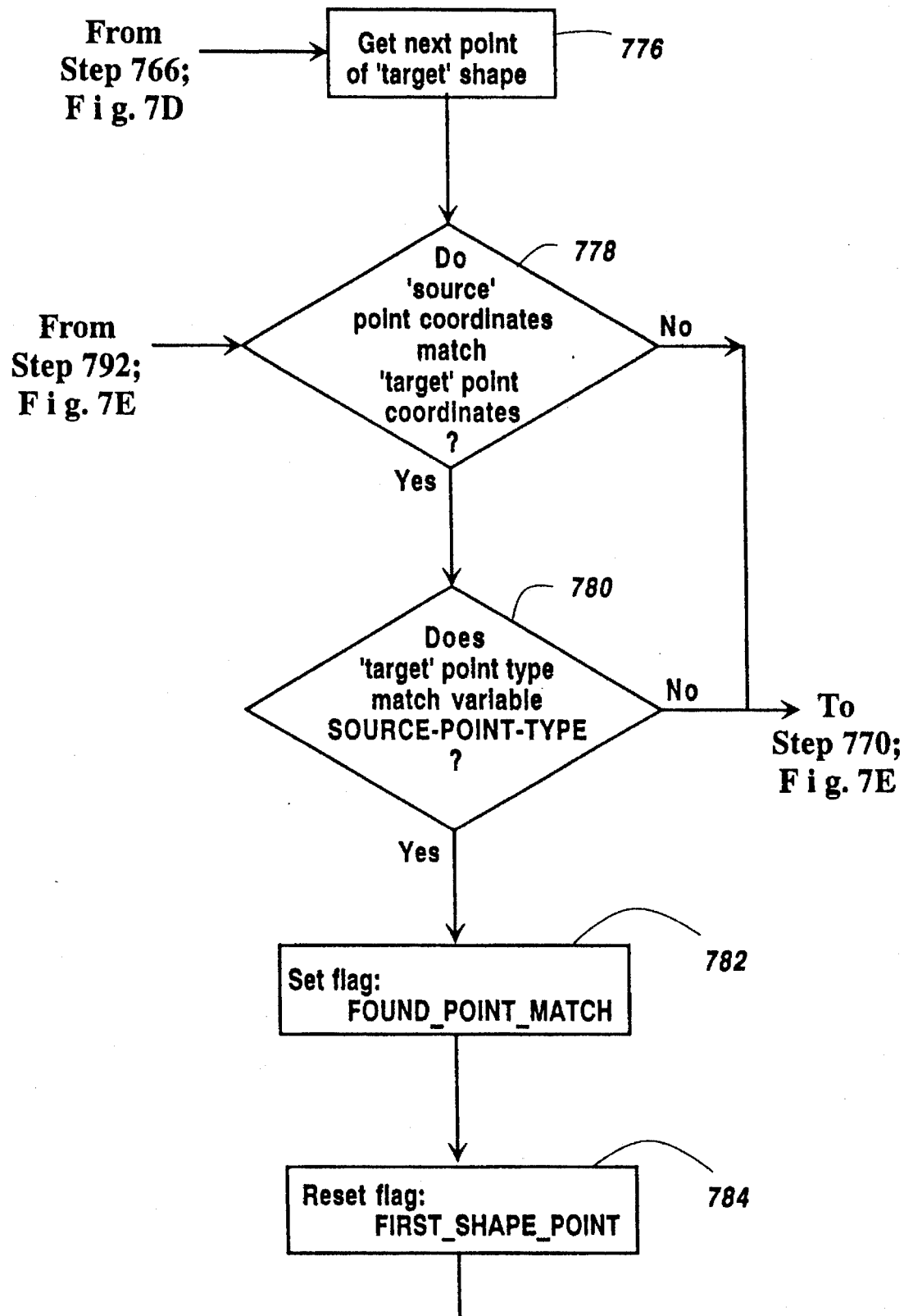

FIGS. 7A–7F shows the process of the present invention for detecting patterns of the original drawing that have been modified and are therefore obsolete or unique. A pattern is considered obsolete or unique if any of the source shapes making up that pattern do not have an exact duplicate target shape. Once a pattern is flagged as obsolete or unique, the user has the option of allowing the program to automatically delete this pattern. Referring to FIG. 7A, the process starts at step 702. Then, in step 704, the original drawing attributes are defined by the user and assigned to the entities of the original drawing. Similarly, step 706 assigns the new drawing attributes defined by the user to entities of the new or updated drawing. Prior to step 708, the original and modified drawings are stored in memory. In step 708, the files containing the original and updated drawings are merged into a common vector file (the merged set or common file). After step 708, steps 710 and 710 effect a search of the drawing file for views (or more views for successive iterations). If step 712 determines that no views are located in the drawing file, then step 714 effects an erasure of the original drawing and updated drawing attributes. The reasons for this are the same as those previously mentioned for step 616 in FIG. 6A. After erasure of the attributes, the process is terminated in step 716. If step 712 determines that views are in the drawing file, then step 718 effects a retrieval of a view (or the next view for successive iterations). Step 720 then determines whether the view retrieved has original drawing attributes. If the drawing does have an original drawing attribute, then step 722 effects a search for children of the view (or more children of the view for successive iterations). If step 722 determines there are no children of the view, then step 712 effects another search for more views in the drawing file. If step 722 determines there are children of the view, then step 724 effects a retrieval of a source entity grouping. At this time, it is not known if the source entity grouping is a pattern or a shape. Step 726 then resets the Not Found Entity, Match flag to indicate that no match has yet been found between a source entity grouping and a target entity grouping.

Step 730 then determines whether the entity grouping is a pattern. If the entity grouping is not a pattern, then step 732 resets the Entity Is A Pattern flag. If the entity is not a pattern, then the entity is a shape. Thus, the process shifts to step 754. This step and those following will be discussed below. If step 730 determines the entity grouping is a pattern, then step 734 sets the Entity Is A Pattern flag to indicate the entity grouping retrieved in step 724 is a pattern. Step 736 then determines whether the Not Found Entity Match flag is set. If step 736 determines the flag is set, then the source entity does not match the target entity and thus, the source entity is obsolete or unique. Step 738 then produces a prompt to give the user a choice as to whether the entity is to be deleted. In step 740, the user responds such that the entity is or is not deleted. If the user indicates that the entity is to be deleted, then step 742 determines whether the Entity Is A Pattern flag is set. If step 742 determines that the flag is not set, then step 744 effects a deletion of the source shape. If step 742 determines the flag is set, then step 746 effects a deletion of the source pattern. Once the source shape or source patterns have been deleted, step 722 initiates a search of the view to determine whether there are more children of the view. If in step 740, the user indicates the entity is not to be deleted, then step 722 initiates a search for more children of the view.

If in step 736, it is determined that the Not Found Entity Match is not set, then step 748 determines whether the Entity Is A Pattern flag is set. If the flag is not set, then step 722 effects a search to determine whether there are more children of the view. Step 748 determines whether the entity is a shape or a pattern. If the entity is a shape, then the process loops to step 722 to retrieve the next source entity. If step 750 determines there are more shapes in the source pattern, then step 752 effects a retrieval of a source shape (for successive iterations, this will be the next source shape). In step 754, the source shape-type is stored in memory. Step 756 then sets the First Shape Point flag to indicate that the first point in the source shape is about to be processed. Next, step 758 then resets the Found Point Match flag to indicate no match has yet been found for the next source shape point. Step 760 then determines whether there are more points in the source shape. If step 760 determines there are no more points in the source shape, then step 736 determines whether the Not Found Entity Match flag is set. Step 736 and the steps following thereafter have been previously explained above. If in step 760, it is determined there are points in the source shape (or more points for a successive iteration), then step 762 effects a retrieval of the next source point. Step 764 then saves the source point-type in memory. Step 766 then determines whether the First Shape Point flag is set. If the First Shape Point flag is not set, then step 776 effects a retrieval of the next point of the target shape. Step 778 and the steps following thereafter are explained below. If it is determined in step 766 that the flag is set, then steps 768 and 770 initiate a search from the top of the drawing file to determine whether there are more shapes in the drawing file. The process then loops through steps 770, 786, and 788 until a shape is found with the new drawing attributes, or until there are no more shapes in the drawing file. Once a target shape is found with the new drawing attribute, step 790 determines whether the target shape-type matches the source shape-type. If there is no match, then the process jumps back to step 770 to resume the above loop. If, on the other hand, there is a match, then step 792 effects a retrieval of the first target shape point. The process then moves to step 778.

Steps 778 and 780 next compare the source and target point types as well as the source and target point coordinates. If either of these do not match, the process goes back to step 770. If, on the other hand, these do match, then the process sets the Found Point Match flag in step 782 and resets the First Shape Point flag in step 784. Next, it jumps back to step 772 to begin testing the remainder of the source shape points against the remainder of the target shape points as described previously.

As mentioned above, the process loops through steps 770, 786, and 788 until a matching shape is found or until there are no more shapes in the drawing file. If step 770 determines there are no additional shapes in the drawing file, the process shifts to step 772. This step determines if the Found Point Match flag is set. If so, step 758 resets this flag and step 760 then determines if there are more points in the source shape. If there are no points left in the source shape, then all the source points have been processed. The process then shifts to step 736 which determines whether the Not Found Entity Match flag is set. This flag will not be set if either the source point coordinates do not match the target point coordinates, or the source shape point-type does not match the target shape point-type. Thus, the source shape is obsolete if: (i) step 790 is unable to find a target shape type that matches the source shape type, and either (ii) step 778 finds a shape with source shape point coordinates that do not match the target shape point coordinates exactly, or (iii) step 780 finds a shape with source shape point-types that do not match the target shape point-types exactly. If the Not Found Entity Match flag is set, step 738 allows the user to decide whether to delete the source entity that was determined to be obsolete.

Preferably, the processes of the present invention may be combined into a single process. This single process allows the user to automate much of the process of merging multiple levels of individual drawings. If both processes are combined into one process, it is preferred to change the color of or colorize the shapes of the original drawing prior to merging the original drawing with the updated drawing. Colorizing or changing the color of the shapes provides a useful tool for allowing the user to visually follow the process and verify that all duplicate and/or obsolete shapes are properly processed. For instance, as each source pattern is processed, its color is returned to its original hue. Therefore, any remaining entities that are colorized must still be processed. The processes of the present invention may be implemented with a variety of software and hardware systems.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

While the invention has been illustrated and described in what are considered to be the most practical and preferred embodiments, it will be recognized that many variations are possible and come within the scope thereof, the appended claims being entitled to a full range of equivalents.

Thus, having described the invention, what is claimed is:

1. A process for merging computer-aided-design (CAD) drawing files, comprising the steps of:

(a) providing an original drawing file having at least one original drawing entity;

(b) assigning a first attribute to the original drawing entity;

(c) providing a modified drawing file based on the original drawing file and having at least one modified drawing entity;

(d) assigning a second attribute to the modified drawing entity;

(e) merging the original drawing file with the modified drawing file to form a common drawing file that includes the original drawing entity and the modified drawing entity;

(f) searching the common drawing file for and retrieving an entity having the first attribute;

(g) searching the common drawing file for and retrieving an entity having the second attribute;

(h) comparing the entity having the first attribute with the entity having the second attribute; and (i) automatically deleting from the common drawing file the entity having the second attribute if it is a duplicate of the entity having the first attribute.

2. The process of claim 1 wherein said deleting step (g) further includes the step of automatically deleting the entity having the first attribute if it has been modified in the modified drawing.

3. The process of claim 2 wherein the original drawing entity and the modified drawing entity are shapes and said comparing step (f) further includes the steps of:

searching the common drawing file for and retrieving a shape having the first attribute;

searching the common drawing file for and retrieving a shape having the second attribute; and determining whether the shape having the first attribute matches the shape having the second attribute.

4. The process of claim 3 wherein each shape having the first attribute or the second attribute has a corresponding shape-type, said determining step further comprises the step of determining whether the shape-type of the shape having the first attribute shape matches the shape-type of the shape having the second attribute.

5. The process of claim 4 wherein each shape having the first attribute or the second attribute has corresponding point coordinates, said process further comprising the step of determining whether the point coordinates of the shape having the first attribute match the point coordinates of the shape having the second attribute.

6. The process of claim 5 further comprising the step of determining whether the point-type of the shape having the first attribute shape matches the point-type of the shape having the second attribute.

7. The process of claim 1 wherein prior to step (e), the entity having the first attribute is colorized.

8. The process of claim 7 wherein after step (f), the entity having the first attribute is decolorized.

9. The process of claim 1, further including step (h) of storing the resulting common drawing file in a storage medium.

10. A process for merging computer-aided-design (CAD) drawing files comprising the steps of:

(a) providing an original drawing file having at least one original drawing entity;

(b) assigning a first attribute to the original drawing entity;

(c) providing a modified drawing file based on the original drawing file and having a at least one modified drawing entity;

(d) assigning a second attribute to the modified drawing entity;

(e) merging the original drawing file with the modified drawing file to form a common drawing file that includes the original drawing entity and the modified drawing entity;

(f) searching the common drawing file for and retrieving an entity having the first attribute;

(g) searching the common drawing file for and retrieving an entity having the second attribute;

(h) (f) comparing the entity having the first attribute with the entity having the second attribute; and (i) (g) automatically deleting from the common drawing file the entity having the first attribute if it has been modified in the modified drawing.

11. The process of the claim 10 wherein said deleting step (g) further includes the step of automatically deleting from the common drawing file the entity having the second attribute if it is a duplicate of the entity having the first attribute.

12. The process of claim 11 wherein the original drawing entity and the modified drawing entity are shapes and said comparing step (f) further includes the steps of:

searching the common drawing file for and retrieving a shape having the first attribute;

searching the common drawing file for and retrieving a shape having the second attribute; and determining whether the shape having the first attribute matches the shape having the second attribute.

13. The process of claim 12 wherein said determining step further comprises the step of determining whether the shape-type of the shape having the first attribute shape matches the shape-type of the shape having the second attribute.

14. The process of claim 13 further comprising the step of determining whether the point coordinates of the shape having the first attribute match the point coordinates of the shape having the second attribute.

15. The process of claim 14 further comprising the step of determining whether the point-type of the shape having the first attribute shape matches the point-type of the shape having the second attribute.

16. The process of claim 10 wherein prior to step (e), the entity having the first attribute is colorized.

17. The process of claim 16 wherein after step (f), the entity having the first attribute is decolorized.

18. The process of claim 10 further including step (h) of storing the resulting common drawing file in a storage medium.

* * * * *